Patented July 30, 1929.

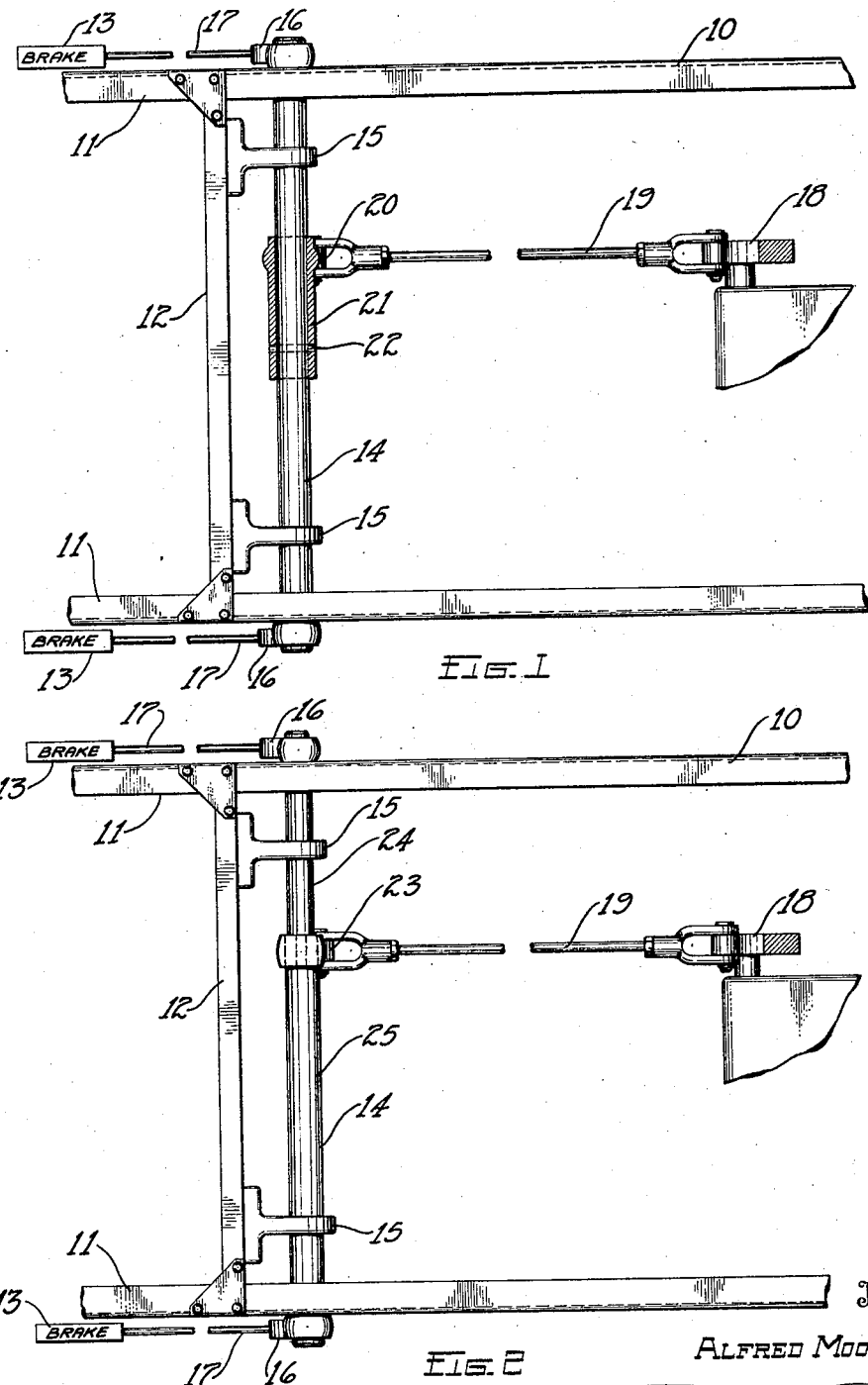

1,722,336

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE BRAKE.

Application filed October 22, 1926. Serial No. 143,339.

This invention relates to motor vehicles and more particularly to brake shafts.

In the general structure of motor vehicles the transmission gear case is supported by the frame of the vehicle in the central longitudinal plane of the frame in alinement with the motor and the operator's seat is on the left or right side of the vehicle. A foot lever is conveniently arranged for the operator and has a direct connection through a suitable linkage with the brake rock shaft.

Because of the position of the transmission gear case, the connection between the foot lever and the rock shaft is made by means of a rod connected to an arm mounted on the rock shaft to one side of the center of the rock shaft's length. Accordingly, the rock shaft has a short shaft section on one side of the rocker arm and a longer shaft section on the other side of the rocker arm.

Since these shaft sections are of the same diameter it naturally follows that the shorter arm possesses the greater resistance to torsional distortion. Thus the brakes which are connected by a suitable linkage to the respective ends of the rock shaft cannot by virtue of the variance in torsional distortion be applied with equal pressure.

To overcome this difficulty is one of the objects of this invention.

Another object of the invention is the equalization of the pressure of brakes by a unique coupling of the rocker arm to the rocker shaft.

Another object of the invention is the equalization of the pressure of brakes by balancing the resistance to torsional distortion of the brake rocking shaft on each side of the rocking arm.

A further object of the invention is the equalization of the pressure of brakes when actuated by a rocker shaft, the rocking arm of which is mounted upon the shaft to one side of the center of the shaft's length, by connecting the rocking arm to the shaft in such a manner that the shaft sections on the respective sides of the rocker arm will be equal in length and will possess the same torsional characteristics.

A still further object of the invention is the equalization of the pressure of brakes when actuated by a rocking shaft having a rocking arm connected thereto in such a position that the shaft will have a short shaft section on one side of the rocker arm and a longer shaft section upon the other side of the arm, the short shaft section being reduced in diameter to balance the resistance to torsional distortion of the respective shaft sections.

Other objects and advantages will appear from the following description taken in connection with the drawings, which form a part of this specification, and in which:—

Fig. 1 is a plan view of the central portion of a motor vehicle frame with brake actuating mechanism employing the invention, and Fig. 2 is a similar view illustrating a modified form.

Referring by numerals to the drawings, 10 represents a motor vehicle frame comprising side bars 11 and a cross bar 12. In Fig. 1 the brakes of the vehicle are indicated diagrammatically as they may be of any desired construction. The brakes are indicated at 13 and are to be operated in a manner to be hereinafter described.

For the operation of the brakes there is a rock shaft 14. The rock shaft 14 is mounted in suitable brackets 15 connected to the frame, the ends of the shaft extending through the side bars. At each end of the shaft there is an arm 16 and a link or rod 17 connecting the arm with the respective brakes 13, so that the rocking of the shaft 14 actuates the brakes 13.

A foot lever 18 is mounted in the conventional manner and is conveniently arranged for the operator. Because of the general structure of motor vehicles wherein the transmission gear case is in the central longitudinal plane of the frame and the operator or driver sits to the left or right hand side of the vehicle, it becomes necessary to arrange the foot lever to one side.

It is desirable to have a direct connection from the foot lever 18 to the rock shaft 14. In the usual structure such connections include an arm mounted upon the shaft and connected by a link to the foot lever. This structure however, has been found faulty in that such a connection does not admit of an equal pressure of the brakes, since the arm is connected to the rock shaft to one side of the center of its length. Hence there is a short section of shaft on one side of the arm and a longer section of shaft on the other side of the arm. Since these respective shaft sections have the same diameter throughout and are of different length, they have not the same torsional characteristics. Thus when the shaft is rocked to apply the brakes there is an uneven pressure exerted upon the brakes, varying of course as to the relative lengths of the shaft sections.

In the structure shown in Fig. 1, the foot lever 18 is connected by a suitable linkage, or as illustrated by a rod 19 to an arm 20. The arm 20 is keyed to or otherwise connected to a sleeve 21. The sleeve 21 is mounted upon the rock shaft 14 and is of such a length that when the arm 20 is in alinement with the foot lever 18 the sleeve will extend to or beyond the center of the length of the rock shaft. The rock shaft 14 is provided with means centrally disposed in its length for connecting the sleeve. As shown the key 22 is used for this purpose.

In such a structure, when the foot lever is operated to rock the shaft 14, power is applied to the shaft centrally between the arms 16 upon the ends thereof. The sections of the shaft on each side of its connection with the sleeve are the same in diameter and length, hence there is an equalization of the resistance to torsional distortion of the shaft sections, thus as power is transmitted through the shaft sections to actuate the brakes connected to the ends of the shaft, there will be transmitted an equal pressure on each of the brakes.

In Fig. 2 I have shown a modification wherein the rock shaft 14 has an arm 23 keyed or otherwise connected to the shaft 14. The arm 23 is to one side of the center of the length of the shaft. Thus on one side of the arm 23 there is a short shaft section 24 and on the other side of the arm a longer shaft section 25. The conventional connections as hereinbefore described are connected to the respective ends of the rock shaft for actuating the brakes when the shaft is rocked by the foot lever 18 connected to the arm 23 by the link or rod 19.

In order to produce the same resistance to distortion in the short shaft section 24 and the longer shaft section 25, the short shaft section 24 is turned down to a smaller diameter than the diameter of the shaft section 25. In fact the diameter of the short shaft section is reduced so that the resistance to torsional distortion of the short shaft section and the longer shaft section are substantially equal. Thus in operating the foot lever 18, to rock the shaft 14, the short and longer shaft sections having the same torsional characteristics, an equalization of pressure is obtained when applying the brakes which are connected by a suitable linkage to the rock shaft.

While I have shown and described the preferred embodiment of my invention, I wish it to be understood that I do not confine myself to the precise details of construction herein set forth, by way of illustration, as it is apparent that many changes and variations may be made therein, by those skilled in the art, without departure from the spirit of the invention, or exceeding the scope of the appended claims.

Having thus described my invention what I claim as new and desire to secure by Letters Patent is:—

1. A shaft having a reduced portion, the resistance to torsional distortion of which is equal to the resistance to torsional distortion of that portion which is not reduced.

2. In a brake mechanism, a rock shaft, means for rocking the shaft, a short shaft section on one side of the rocking means and a longer shaft section on the other side of the rocking means, the short shaft section being reduced in diameter to balance in resistance to torsional distortion with the resistance to torsional distortion of the longer shaft section.

3. In a brake mechanism, the combination with the brakes, a rock shaft for operating the brakes, a lateral actuating means connected to the rock shaft at one side of the center of the shaft's length, the shaft sections on the respective sides of the actuating means being equalized in resistance to torsional distortion for operating the brakes with balanced action.

4. In a brake mechanism, the combination with the brakes, a rock shaft for operating the brakes, a lateral actuating arm upon the rock shaft at one side of the center of the shaft's length, the shaft sections on the respective sides of the actuating arm having different diameters to equalize the resistance to torsional distortion of the shaft sections for operating the brakes with balanced action between them.

5. In a brake mechanism, a rock shaft having a reduced portion, the resistance to torsional distortion of which is equal to the resistance to torsional distortion of that portion which is not reduced.

In testimony whereof I affix my signature.

ALFRED MOORHOUSE.